United States Patent [19]
Lin et al.

[11] Patent Number: 5,983,279
[45] Date of Patent: Nov. 9, 1999

[54] BUFFER MANAGEMENT MECHANISM FOR DISTRIBUTED MULTIMEDIA APPLICATIONS

[75] Inventors: Mengjou Lin, San Jose; Alagu Periyannan, Aptos, both of Calif.

[73] Assignee: Apple Computer, Inc., Cupertino, Calif.

[21] Appl. No.: 08/707,202

[22] Filed: Aug. 30, 1996

[51] Int. Cl.$^6$ ........................................... G06F 17/00
[52] U.S. Cl. ........................................................ 709/235
[58] Field of Search ...................... 395/200.64, 200.43, 395/200.65, 876; 370/233, 236, 468; 709/235

[56] References Cited

U.S. PATENT DOCUMENTS

| | | | |
|---|---|---|---|
| 5,014,265 | 5/1991 | Hahne et al. | 370/468 |
| 5,179,556 | 1/1993 | Turner et al. | 370/233 |
| 5,327,558 | 7/1994 | Burke et al. | 395/828 |
| 5,367,637 | 11/1994 | Wei | 395/876 |
| 5,437,013 | 7/1995 | Rubin et al. | 395/200 |
| 5,734,825 | 3/1998 | Lauxck et al. | 395/200.65 |

*Primary Examiner*—Ellis B. Ramirez
*Attorney, Agent, or Firm*—Sawyer & Associates

[57] ABSTRACT

The present invention allocates a buffer within a buffer pool to each connection to an application or to each application. By managing the user of the buffers in this manner, the present invention avoids the conventional problems of the possibility of a dominant application monopolizing virtually all of the available buffer space and forcing the other applications to wait for space to become available. Additionally, because each application has its own buffer space allocated to it, it minimizes the risk of the problems of one application contaminating other applications. A method according to the present invention for buffer management for transferring data in a processing system comprises the steps of opening a virtual circuit, allocating a buffer for the virtual circuit, utilizing the buffer, and returning control of the buffer to an owner after utilization of the buffer.

40 Claims, 7 Drawing Sheets

BUFFER MANAGEMENT MECHANISM FOR DISTRIBUTED MULTIMEDIA APPLICATIONS

FIELD OF THE INVENTION

The present invention relates to a method and system of buffer management in a processing system. More particularly, the present invention is a method and system of an efficient communication buffer management mechanism for a network environment.

BACKGROUND OF THE INVENTION

The ability to connect a community of data processors and users together over a high speed connection medium has many advantages. They can communicate quickly and share data that is commonly owned and updated by the user group. Additionally, they can share resources such as large arrays of hard disk storage, printers, modems, and fax machines. A typical network environment consists of a central processing unit coupled with a network interface card which in turn is coupled with the network. The network is also coupled with at least one other network interface card which is coupled with another central processing unit.

In a network environment, a conventional system for buffer management is typically configured such that multiple applications share a single buffer pool. The buffer pool is accessed when data is received from the network as well as when data is sent out to the network. More detailed background information regarding buffer management in a network environment may be found in U.S. Pat. No. 5,437,013, issued Jul. 25, 1995 to Rubin et al.

Multi-media applications typically have special requirements which the network environment needs to accommodate. For instance, multi-media applications typically have a large volume of data due to audio and graphic data in addition to text. It also requires the data to be transferred or rendered in real time, in addition to requiring a consistent delay time to avoid what is referred to as "jitter".

One of the problems associated with the conventional system for buffer management is that if one application requires large amounts of buffer space within the buffer pool, the other applications cannot gain access to the buffer pool, thereby forcing the remaining applications to wait until space becomes available. This problem is especially common in multi-media applications where large amounts of buffer space is typically required.

Another problem associated with the conventional system of buffer management is that to avoid contaminating the other applications sharing the buffer pool, multiple copy operations of the data packet are typically required. The multiple copy operations can cause inconsistent delays in data communication.

Accordingly, what is needed is an improved system and method for buffer management which avoids the stated problems of the conventional systems.

SUMMARY OF THE INVENTION

The present invention avoids the problems with conventional systems for buffer management while facilitating the special requirements for multi-media applications. The present invention allocates a buffer for each connection to an application or alternatively, for each application. By managing the user of the buffers in this manner, the present invention avoids the problem of a dominant application monopolizing virtually all of the available buffer space and forcing the other applications to wait for space to become available. Additionally, because each application has its own buffer space allocated to it, the risk of one application contaminating another is minimized.

A method according to the present invention for buffer management for transferring data in a processing system comprises the steps of opening a virtual circuit, allocating a buffer for the virtual circuit, utilizing the buffer, and returning control of the buffer to an owner after utilization of the buffer.

A system according to the present invention for buffer management for transferring data in a processing system comprises a virtual circuit, a buffer allocated for the virtual circuit, and an owner to which control of the buffer is returned after utilization of the buffer.

DETAILED DESCRIPTION

The present invention relates to an efficient communication buffer management mechanism for a network environment. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
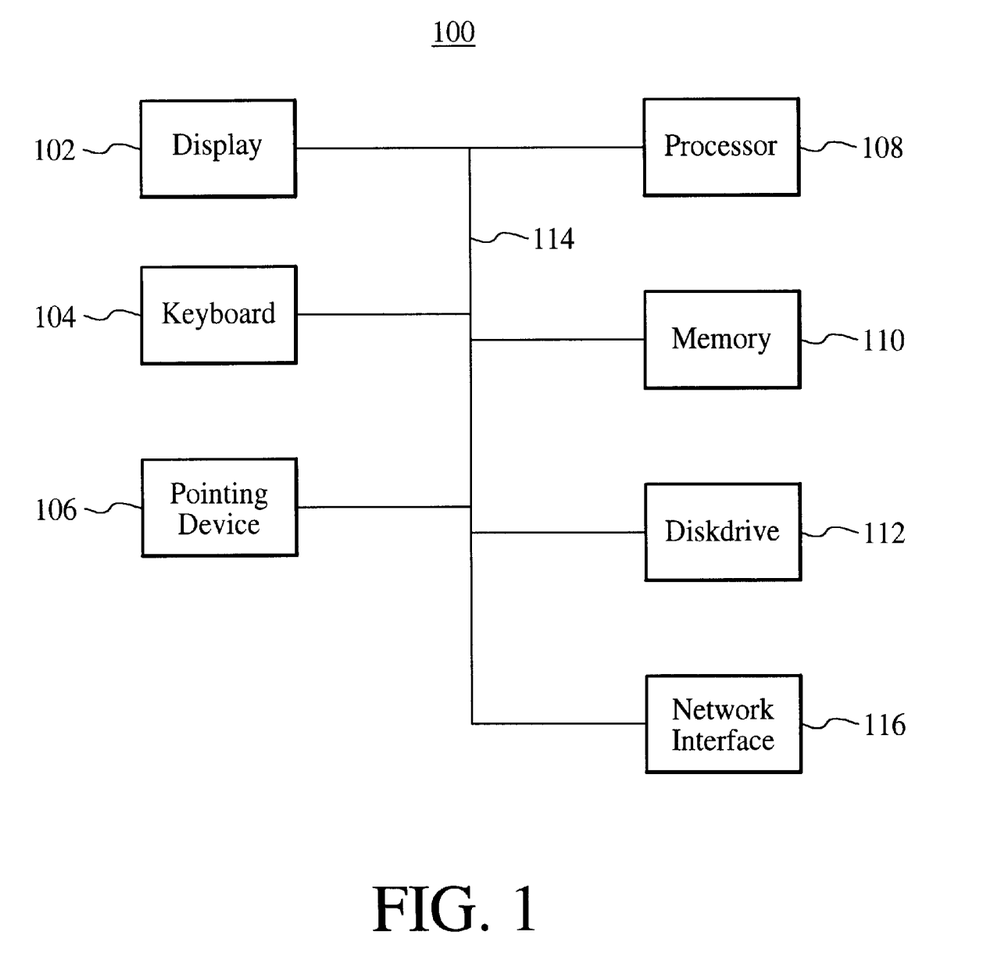
FIG. 1 is a block diagram of a system in which the present invention can reside.

FIG. 1 is a block diagram illustrating a conventional computer system 100, which includes a display 102, a keyboard 104, a pointing device 106, a processor 108, a memory 110, a disk drive 112, and a network interface 116 which are all connected by a bus 114. Processor 108 works in conjunction with memory 110, bus 114 and network interface 116 to communicate within the network environment.

Figure 2:
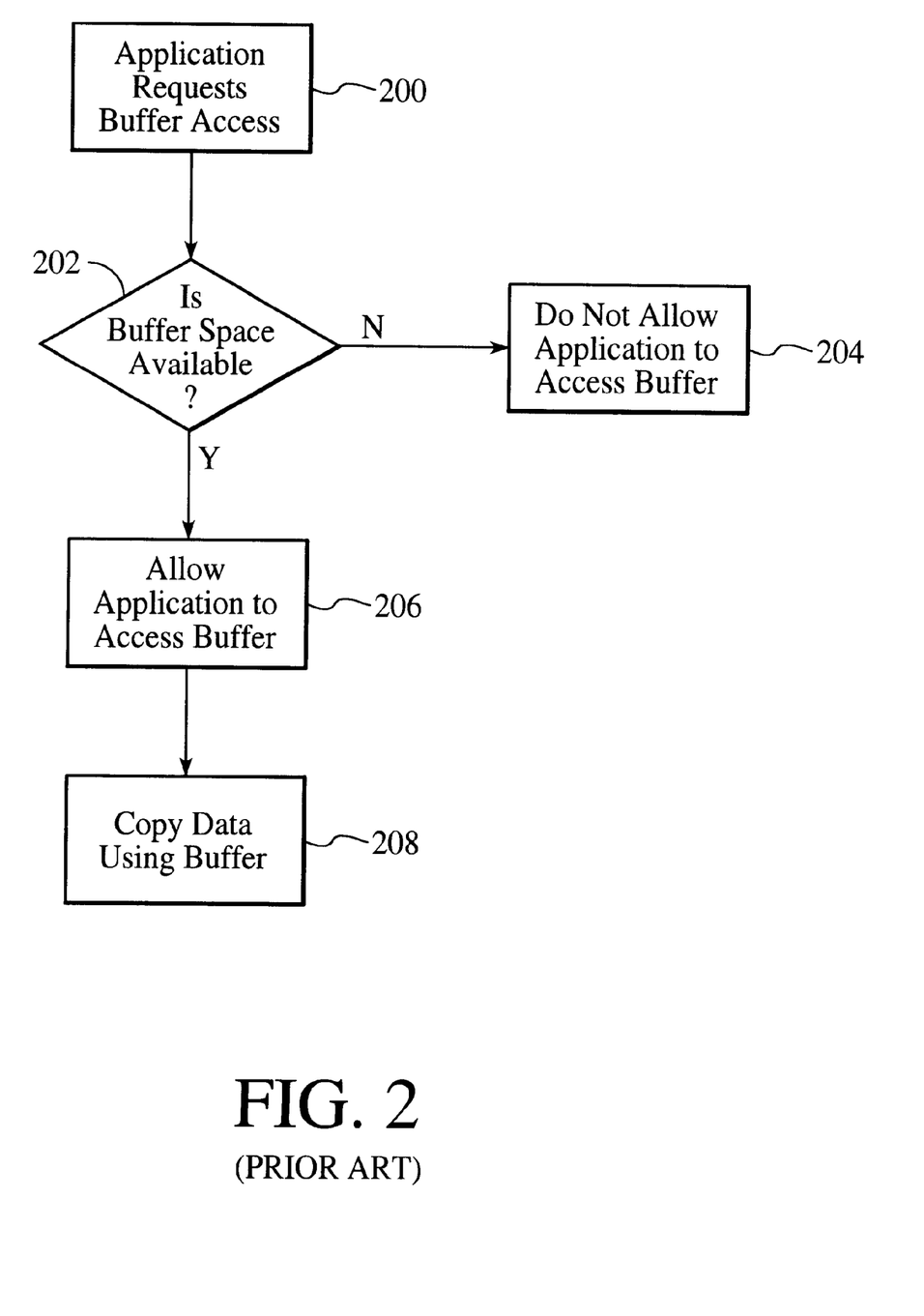
FIG. 2 is a flow diagram of a conventional method and system of buffer management.

FIG. 2 is a flow diagram of a conventional buffer management mechanism. Once an application requests access to a buffer via step 200, it is determined whether buffer space is available via step 202. If no buffer space is available, then the application cannot gain access to the buffer via step 204. If, however, buffer space is available, then the application can access the buffer via step 206. The pertinent data is then typically copied using the buffer via step 208. In a conventional system for buffer management, multiple applications typically share a single buffer pool. The buffer pool is accessed when data is received from the networks as well as when data is sent out to the network.

As previously discussed, a problem associated with the conventional system for buffer management is that if one application requires large amounts of buffer space within the buffer pool, the other applications cannot gain access to the buffer pool, thereby forcing the remaining applications to wait until space becomes available in the buffer pool. This problem is especially common in multimedia applications where large amounts of buffer space is typically required. Another problem associated with the conventional system of buffer management is that multiple copies the data packet typically are required to prevent any potential problems in one application from contaminating the other applications sharing the buffer pool.

The present invention avoids these problems with the conventional systems for buffer management. The present invention allocates a buffer within a buffer pool for each connection to an application or alternatively, for each application. The present invention avoids the conventional problems of the possibility of a dominant application monopolizing virtually all of the available buffer space and forcing the other applications to wait for space to become available. Additionally, because each application has its own buffer space allocated to it, it minimizes the risk of problems from one application contaminating other applications.

The method and system of the present invention can be incorporated for use with any network media including Asynchronous Transfer Mode (ATM), Ethernet, and Fiber Distributed Data Interface (FDDI).

Figure 3:
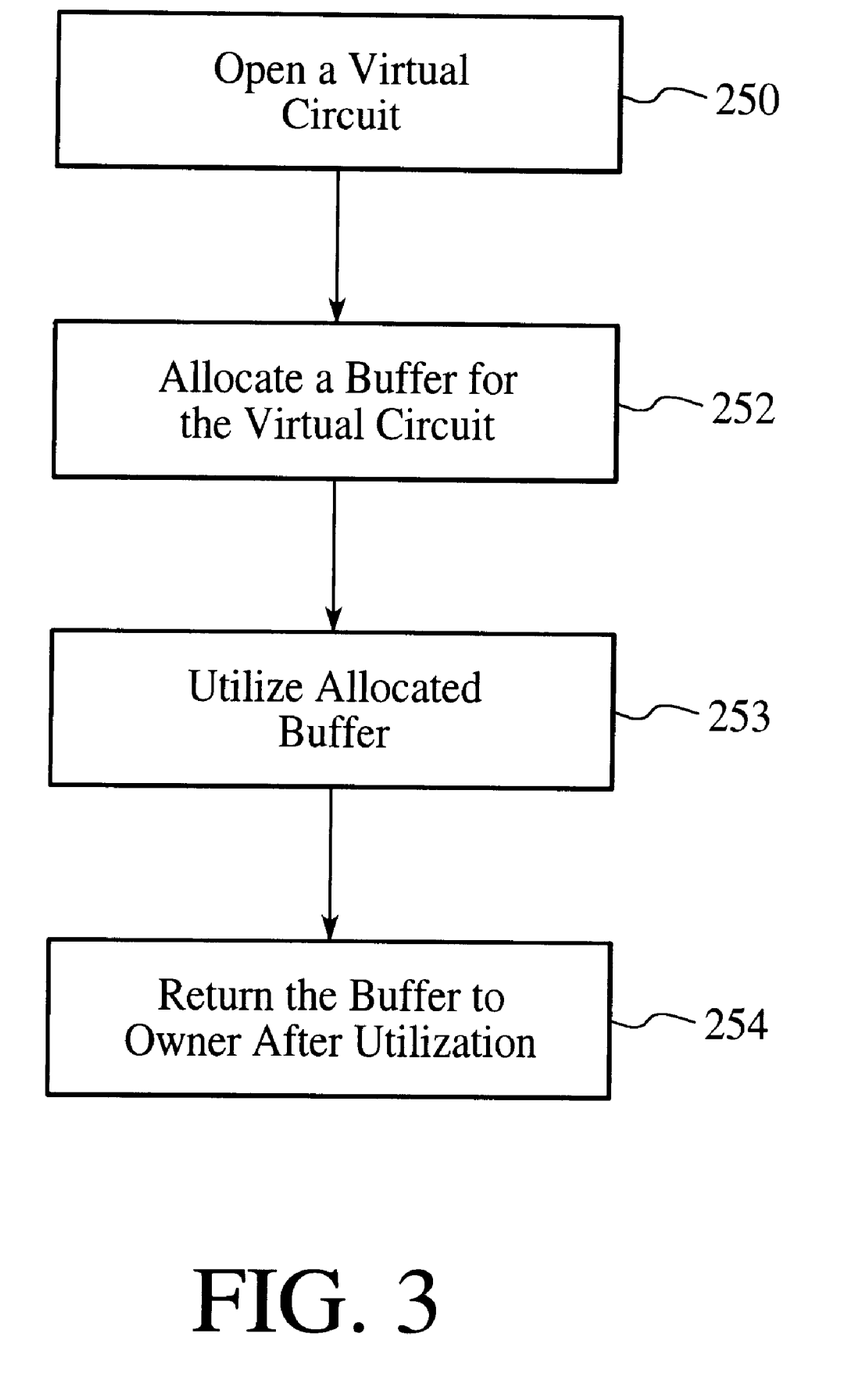
FIG. 3 is a flow diagram of a method and system of buffer management according to the present invention.

FIG. 3 is a flow diagram of a method according to the present invention. As shown in FIG. 3, a virtual circuit is opened via step 250. In the context of the present application, what is meant by a virtual circuit is a connection to other applications or systems in the network. A buffer is then allocated for the opened virtual circuit via step 252. The buffer is preferably a subset of a buffer pool which is preferably located in either the network subsystem or within an application. The buffer is allocated from an owner such as the network subsystem or a system memory management.

The allocated buffer can then be utilized, preferably by an application, via step 253. Utilization of the allocated buffer preferably includes filling the buffer with data and transferring the filled buffer data to a destinator. This process of filling and transferring the buffer data can be repeated until the required data is completely transferred. In the case of receiving data from a network, the received data fills the buffer data and the filled buffer is preferably transferred to an application. In the case of sending data to a network, the data from the application fills the buffer and the filled buffer data is then transferred to the network. Once the transfer is complete, an indication that the filled buffer data has been transferred can be initiated.

When the utilization of the allocated buffer is complete, the buffer is preferably deallocated. The buffer is deallocated by returning the buffer from the destinator to an originator. The originator is preferably the application or the network subsystem, depending on whether the data is being sent or received. In the case of sending data out to a network, the originator of the buffer is typically the application. In the case of receiving the data from a network, the originator of the buffer is typically the network subsystem.

The virtual circuit is then closed. Finally, the control of the buffer is returned to its owner, such as the network subsystem or a memory management, via step 254.

Figure 4:
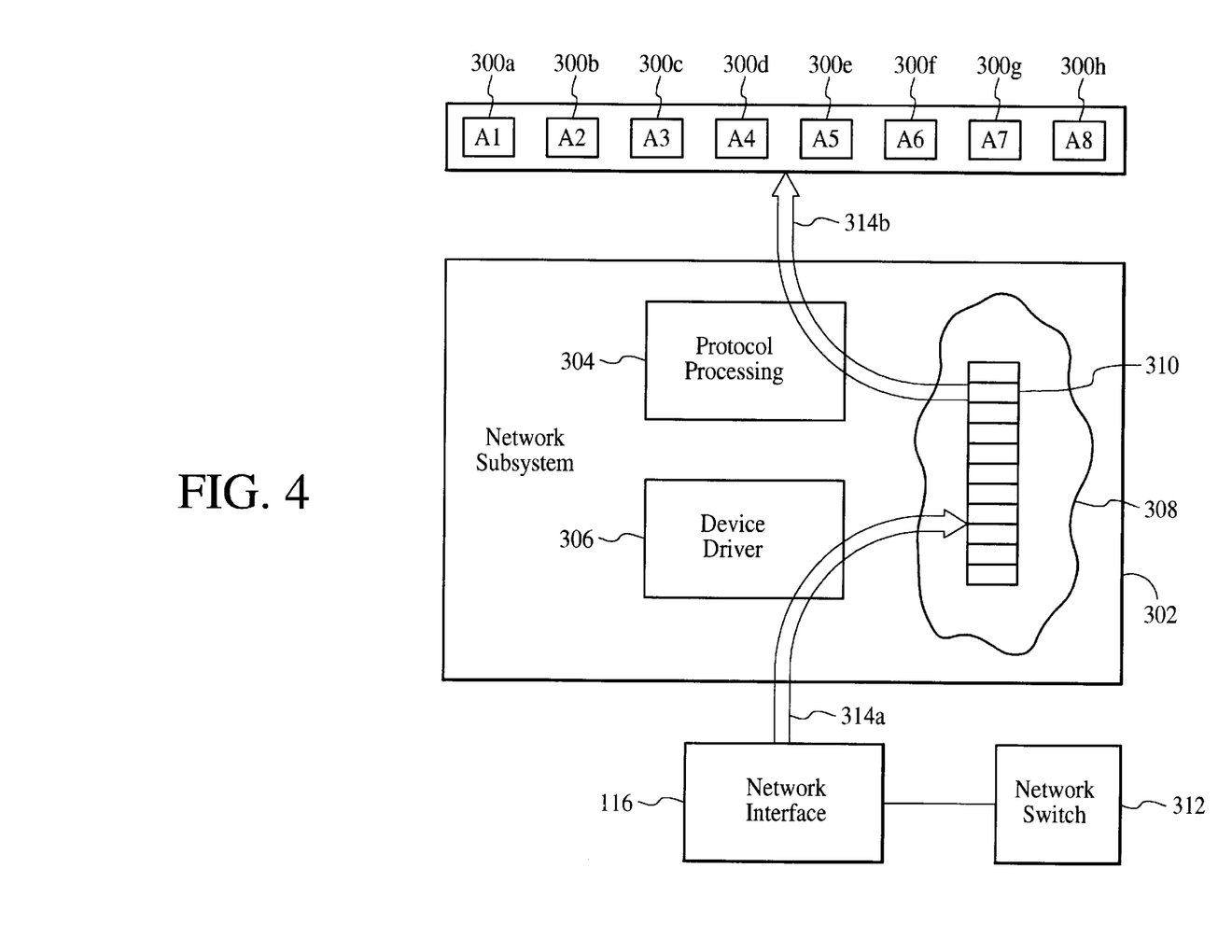
FIG. 4 is a block diagram of a system of buffer management for data being received from a network according to the present invention.
Figure 5:
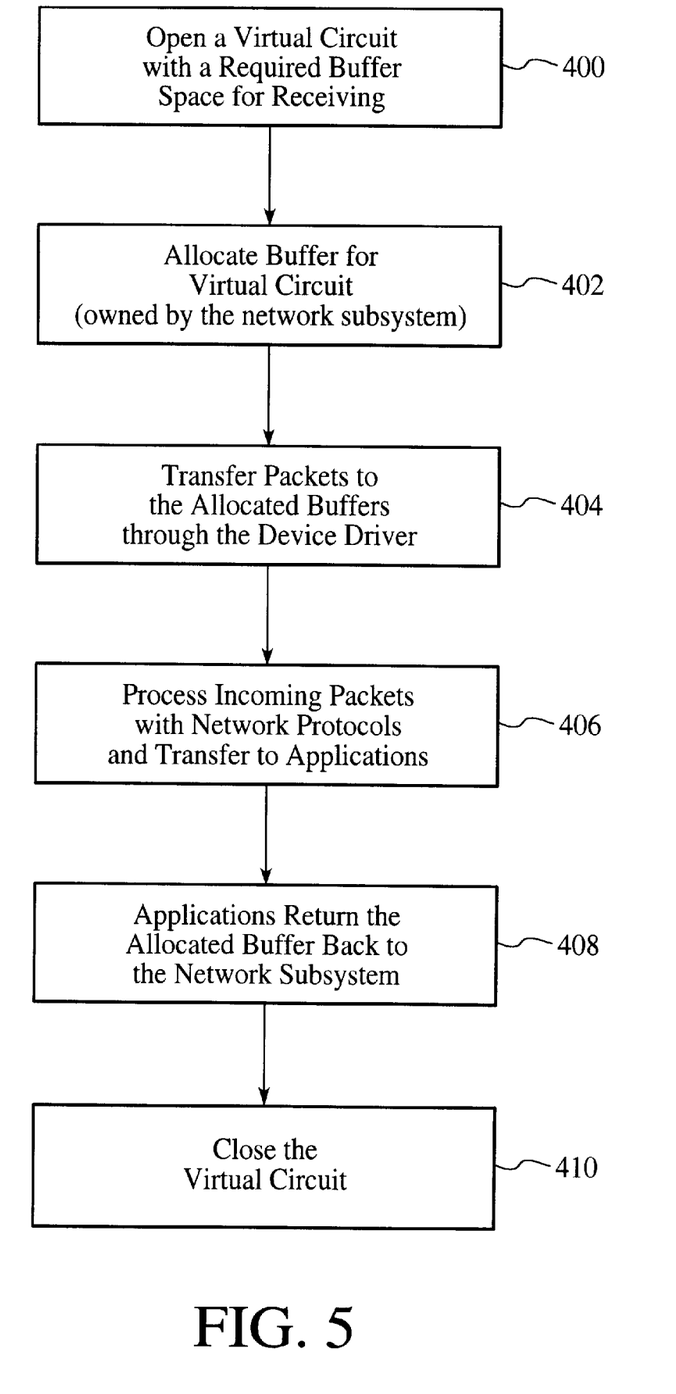
FIG. 5 is a flow diagram of a method of buffer management for data being received from a network according to the present invention.

FIGS. 4 and 5 illustrate the buffer management in accordance with the present invention in a situation where data is being received from the networks. FIG. 4 is a block diagram of a buffer management system according to the present invention. It includes applications 300a–300h, a network subsystem 302, a network interface 116, and a network switch 312. Residing within the network subsystem 302 is the protocol processing 304, device driver 306, buffer pool 308, and an allocated buffer 310.

In the example shown in FIG. 4, a data packet can be transferred from the network interface 116 through a virtual circuit 314a via the device driver 306 into the allocated buffer 310. This data packet can then be transferred from the allocated buffer 310 through a virtual circuit 314b via protocol processing 304 into the appropriate application 300e.

FIG. 5 shows a flow diagram of the data transfer from the network into the application illustrated in FIG. 4. The virtual circuits 314a–314b are opened with the required buffer space for receiving an appropriate data packet from the network via step 400. A buffer 310 is then allocated for the virtual circuit 314 via step 402. In the case of a data transfer from the network into an application, as illustrated in FIGS. 4 and 5, the allocated buffer 310 is owned by the network subsystem 302.

Data packets are transferred into the allocated buffer 310 through the device driver 306 via step 404. The incoming packets are then processed with network protocols and transferred to the appropriate application 300e via step 406. Once this has occurred, the application 300e returns control of the allocated buffer 310 back to the network subsystem 302 via step 408. Finally, the virtual circuits 314 are closed via step 410.

The method and system according to the present invention may also be applied with a buffer allocation for each application rather than for each virtual circuit. Essentially the same method and system shown in FIGS. 4 and 5 would apply with the slight modification of ignoring the steps of opening and closing the virtual circuit via steps 400 and 410.

Figure 6:
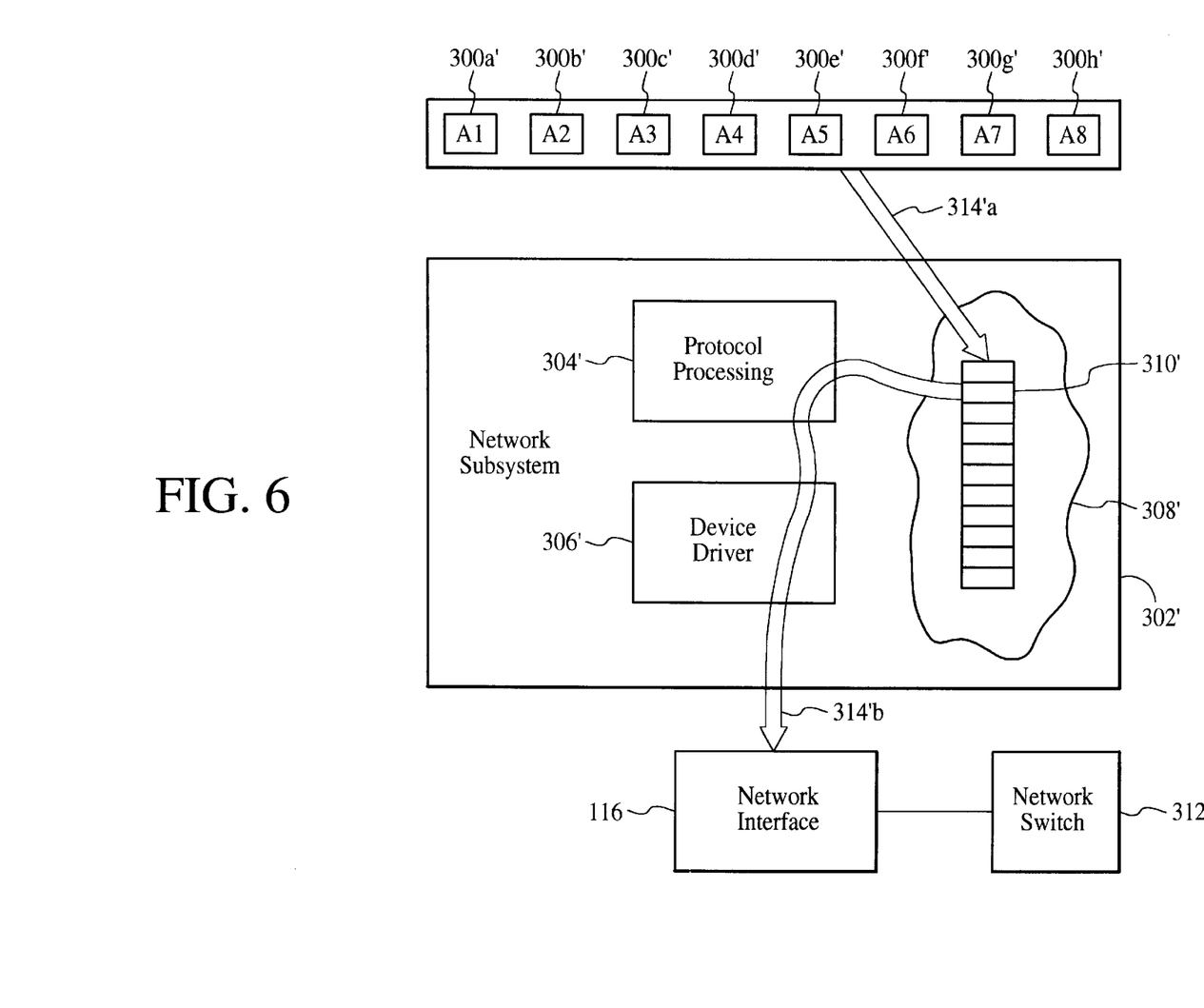
FIG. 6 is a block diagram of a system of buffer management for data being transferred to a network according to the present invention.
Figure 7:
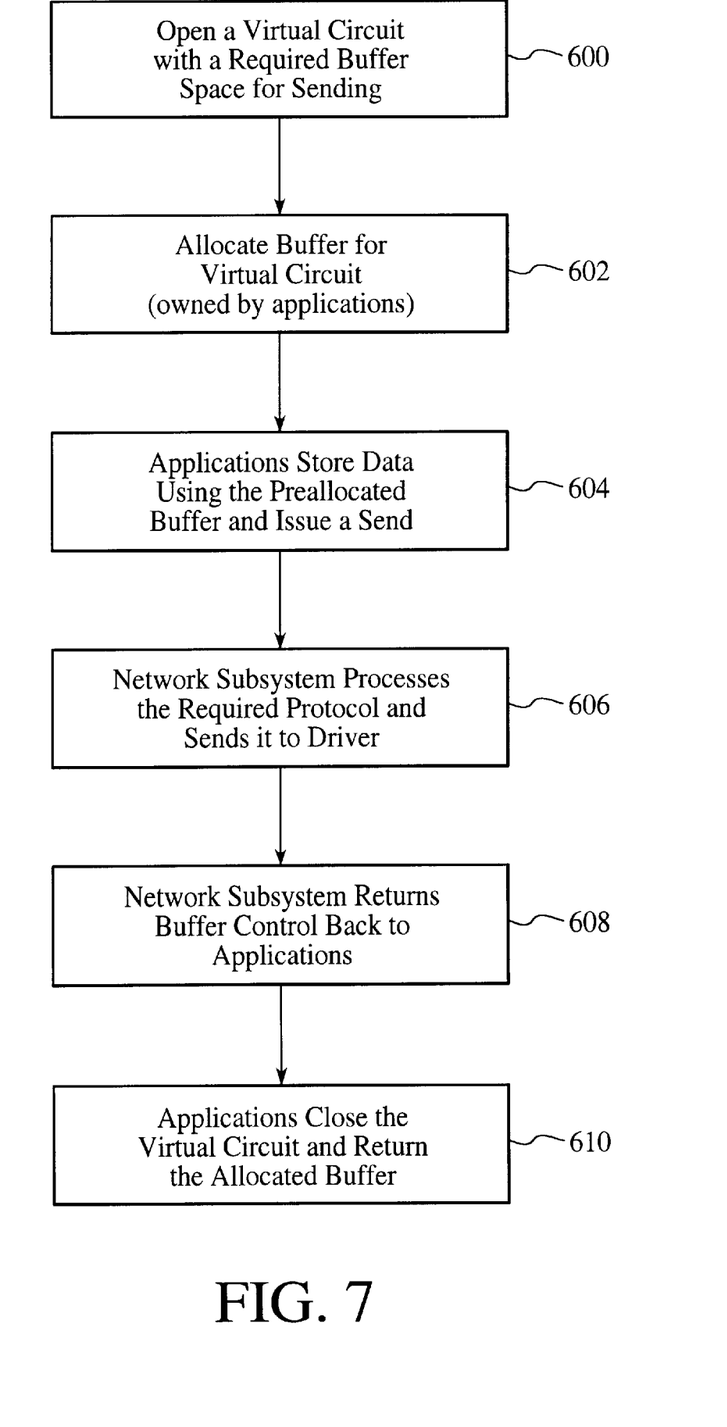
FIG. 7 is a flow diagram of a method of buffer management for data being transferred to a network according to the present invention.

FIGS. 6 and 7 illustrate a system of buffer management for sending data to a network according to the present invention. FIG. 6 is a block diagram of a system for buffer management according to the present invention which includes applications 300a'–300h', a network subsystem 302', a network interface 116, and a network switch 312'. Within the network subsystem resides the protocol processing 304', the device driver 306', a buffer pool 308' and an allocated buffer 310'. A data packet can be transferred from an application 300e' to an allocated buffer 310' through a virtual circuit 314'a. The data packet in the allocated buffer 310' can then be transferred to the network through the virtual circuit 314'b. The data packet will be transferred from the allocated buffer 310' through the protocol processing 304' and the device driver 306' into the network interface 116.

FIG. 7 is a flow diagram of a method for sending data to the network according to the present invention. A virtual circuit 314' is opened with a required buffer space for sending a data packet via step 600. A buffer 310' is then allocated for the virtual circuit 314' via step 602. In the case of sending data to the networks, as illustrated in FIGS. 6 and 7, the virtual circuit 314' is owned by the appropriate application 300e'. The application 300e' then stores the data using the allocated buffer 310' and issues a send via step 604. The network subsystem 302' then processes the required protocol and sends it to the device driver 306' via step 606. The network subsystem 302' returns buffer control back to the applications 300 via step 608. Finally, the virtual circuit 314' is closed and control of the allocated buffer 310' is then returned to the owner via step 610.

As previously discussed, the method and system according to the present invention may also be applied with a buffer allocation for each application rather than for each virtual circuit. Essentially the same method and system shown in FIGS. 6 and 7 would apply with the slight modification of ignoring the steps of operating and closing the virtual circuit via steps 600 and 610.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for buffer management for transferring data through a processing system comprising the steps of:

(a) opening a virtual circuit;

(b) allocating a buffer for the virtual circuit;

(c) utilizing the buffer;

(d) deallocating the buffer by returning control of the buffer from an originator to a destinator;

(e) returning control of the buffer to an owner after utilization and deallocation of the buffer.

2. The method of claim 1, wherein the buffer is a subset of a buffer pool.

3. The method of claim 1, wherein the buffer is utilized by an application.

4. The method of claim 1, wherein the buffer is allocated from the owner.

5. The method of claim 1, wherein the owner is a network subsystem.

6. The method of claim 1, wherein the owner is a system memory manager.

7. The method of claim 1, wherein the step of utilizing the buffer includes the substeps of:

(c1) filling the buffer with data; and (c2) transferring the filled buffer data to a destinator.

8. The method of claim 7, wherein an application fills the buffer with the data.

9. The method of claim 7, wherein a network subsystem fills the buffer with data.

10. The method of claim 7, wherein the destinator is a network subsystem.

11. The method of claim 7, wherein the destinator is an application.

12. The method of claim 7, further comprising step (c3) of indicating that the filled buffer data has been transferred.

13. The method of claim 7, wherein the originator is an application.

14. The method of claim 7, wherein the originator is a network subsystem.

15. The method of claim 1, further comprising step (e) of closing the virtual circuit.

16. The method of claim 1, wherein the virtual circuit provides a connection through the processing system to an application.

17. A system for buffer management for transferring data through a processing system comprising:

a virtual circuit;

a buffer allocated for the virtual circuit, the buffer being deallocated by returning control of the buffer from an originator to a destinator; and an owner to which control of the buffer is returned after utilization and deallocation of the buffer.

18. The system of claim 17, wherein the owner is a system memory manager.

19. The system of claim 17, wherein the owner is a network subsystem.

20. The system of claim 17, wherein the buffer is a subset of a buffer pool.

21. The system of claim 17, further comprising an application which utilizes the allocated buffer.

22. The system of claim 17, wherein the destinator is a network subsystem.

23. The system of claim 17, wherein the destinator is an application.

24. The system of claim 17, wherein the originator is an application.

25. The system of claim 17, wherein the originator is a network subsystem.

26. The system of claim 17, further comprising an application which fills the buffer with data.

27. The system of claim 17, further comprising a network subsystem which fills the buffer with data.

28. The system of claim 17, wherein the buffer is allocated from the owner.

29. A method for buffer management for transferring data through a processing system comprising:

(a) allocating a buffer for an application, the buffer being located in a buffer pool;

(b) utilizing the buffer;

(c) deallocating the buffer by returning control of the buffer from an originator to a destinator; and (d) returning control of the buffer to an owner after utilization and deallocation of the buffer.

30. The method of claim 29, wherein the owner is an application.

31. The method of claim 29, wherein the owner is a network subsystem.

32. The method of claim 29, wherein the application utilizes the buffer.

33. The method of claim 29, wherein the owner comprises a network subsystem.

34. The method of claim 29, wherein the application returns control of the buffer to a network subsystem.

35. A system for buffer management for transferring data through a processing system comprising:

an application;

a buffer allocated for the application, the buffer being located in a buffer pool, the buffer being deallocated by returning control of the buffer from an originator to a destinator; and an owner to which control of the buffer is returned after utilization and deallocation of the buffer.

36. The system of claim 35, wherein the owner is an application.

37. The system of claim 35, wherein the owner is a network subsystem.

38. The system of claim 35, further comprising a network subsystem which returns control of the buffer to the owner.

39. The system of claim 35, further comprising an application which returns control of the buffer to the owner.

40. A computer-readable medium containing program instructions for buffer management for transferring data through a processing system comprising the steps of:

(a) opening a virtual circuit;

(b) allocating a buffer for the virtual circuit;

(c) utilizing the buffer;

(d) deallocating the buffer by returning control of the buffer from an originator to a destinator;

(e) returning control of the buffer to an owner after utilization and deallocation of the buffer.

* * * * *